UNITED STATES PATENT OFFICE.

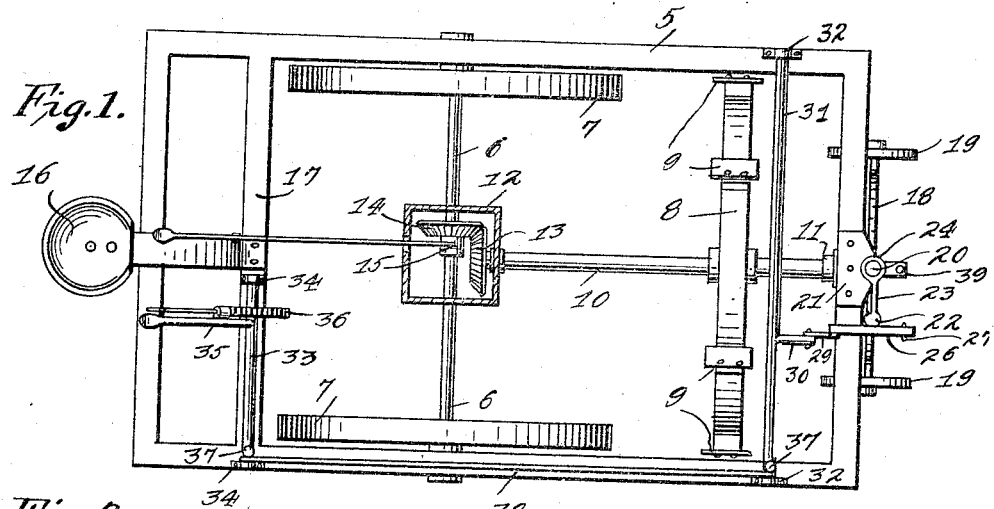

LESLIE T. WILKINS, OF LAUREL, MONTANA.

SUGAR-BEET BLOCKER.

1,205,830.

Specification of Letters Patent. Patented Nov. 21, 1916.

Application filed July 16, 1915. Serial No. 40,326.

*To all whom it may concern:*

Be it known that I, LESLIE T. WILKINS, a citizen of the United States, residing at Laurel, in the county of Yellowstone, State of Montana, have invented certain new and useful Improvements in Sugar-Beet Blockers; and I do hereby declare the following to be a full, clear, and exact description of the invention, such as will enable others skilled in the art to which it appertains to make and use the same.

This invention relates to new and useful improvements in cultivating machines, and is particularly directed to the provision of a machine for thinning out or "blocking" rows of beets or other crops of the like nature.

The object of the present invention resides in the provision of means for adjustably varying the position of the working elements of the device with relation to the ground, in a manner which does not interfere with the driving means for said working elements or in any other manner with the general efficiency with the machine.

It is further the object to embody in the machine of the class described such adjusting means as comprises a minimum number of parts so as to conduce to the provision of a strong durable structure which may be easily operated.

With the above and other objects and advantages in view, the invention resides in the novel combination, formation and arrangement of parts hereinafter described and specifically pointed out in the appended claim.

Reference is had to the accompanying drawings wherein similar characters of reference designate corresponding parts throughout the several views, and in which:

Figure 1 is a top plan view of the improved beet blocking machine. Fig. 2 is a side elevation thereof. Fig. 3 is a front elevation of the machine. Fig. 4 is a detail sectional view on the line 4—4 of Fig. 2.

Referring now more particularly to the accompanying drawings, the improved machine is shown as comprising a rectangular frame 5 at the intermediate portion of which is transversely journaled the drive shaft 6 carrying the ground wheels 7, these ground wheels being disposed within the confines of the frame to permit a maximum width of frame to accommodate the cutting wheel, and one or both of these wheels may be equipped with a suitable clutch connection with the shaft whereby the machine may be quickly turned, this clutch mechanism being not shown. These wheels form the support for the rear of the machine.

For supporting the transverse working wheel 8 which carries at adjustably spaced intervals chopping blades 9, a longitudinal shaft 10 is provided having one end journaled in a bearing 11 carried by the front sill of the machine and its other end journaled in a housing 12 carried on the shaft 6. A gear 13 is carried by the shaft 10 within the housing and adapted to mesh with a similar gear 14 on the drive shaft, a suitable clutch mechanism 15 being associated with this gear 14 whereby it may be thrown into and out of mesh as desired. The seat 16 of the machine is mounted on a suitable transverse bar 17 carried by the frame rearwardly of the shaft 6.

For adjustably supporting the forward end of the frame an axle 18 is provided carrying the relatively smaller wheels 19 which are adapted to extend under the frame and upstanding from the central portion of this axle is a shaft 20 which is slidably and rotatably mounted in a bearing casting 21 secured to and projecting upwardly from the front sills of the frame. The means for adjustably connecting this shaft to the frame so as to not interfere with rotation thereof to steer the machine, a vertical bar 22 is provided parallel to and at one side of the shaft and carries at its ends lateral arms 23 which terminate in eyes 24 laterally receiving the shaft, and held against sliding movement thereon as by the pins 25. A lever 26 is intermediately pivoted to the upper portion of this bar 22 and extends longitudinally of the machine. Pivoted to the forward end of this lever is a link 27 which is also pivoted to a bracket 28 projecting forwardly from the front sill of the frame. Pivoted to the rear end of the lever is a link 29 which is pivoted at its lower end to a crank arm 30 journaled in bearings 32 on the side sills of the frame forwardly of the chopping wheel 8. Thus as the crank arm 30 is rocked downwardly, the lever will be rocked to raise the forward end of the frame with respect to the front axle 18, and to consequently alter the relation of the cutting wheel 8 to the ground.

To provide means operable from adjacent the driver's seat to actuate the shaft 31, a second shaft 33 is journaled in bearings 34 on the transverse bar 17 and carries an upstanding lever arm 35 adapted to be grasped by the operator, said lever arm having associated therewith suitable pawl and ratchet mechanism 36 to hold it in any desired position. Upstanding crank arms 37 are carried by the outer ends of the shafts 31 and 33 and a link 38 connects these arms so that when the lever 35 is moved forwardly the frame will be raised.

By the structure described a comparatively simple and highly efficient chopping or blocking machine has been provided which is capable of full degree of adjustment. The shaft 20 carries adjacent its juncture a suitable draft clevis 39.

While I have illustrated and described a particular embodiment of my invention, I have merely done so for the sake of convenience and I do not wish to be limited to that particular embodiment as it is obvious that numerous changes may be made within the details of construction thereof without in any way departing from the spirit of the invention or exceeding the scope of the appended claim.

What I claim is:

A sugar beet blocker including a wheeled frame, a plant digging element mounted on the front of the frame, means for driving the digging element, a caster mounted on the front of the frame and including a vertically slidable and rotatable pintle, a lever centrally pivoted on the upper portion of the pintle, a crank arm mounted on the frame, a link connected to one end of the lever and to the crank arm, and a link connected to the other end of the lever and to the forward end of the frame.

In testimony whereof, I affix my signature, in the presence of two witnesses.

LESLIE T. WILKINS.

Witnesses:
O. H. BUNDY,
MARY OGLE.

Copies of this patent may be obtained for five cents each, by addressing the "Commissioner of Patents, Washington, D. C."